United States Patent
Hill et al.

[11] Patent Number: 6,073,587
[45] Date of Patent: Jun. 13, 2000

[54] MODULAR ANIMAL SHELTER

[76] Inventors: Dale L. Hill; Chris C. Hill, both of 1305 N. 400 East, Apt. 14, Logan, Utah 84341

[21] Appl. No.: 09/208,681

[22] Filed: Dec. 10, 1998

[51] Int. Cl.[7] .............................. A01K 1/02; A01K 31/08
[52] U.S. Cl. .......................................... 119/474; 119/512
[58] Field of Search .................... 119/436, 474, 119/502, 504, 512, 514; 135/121, 143

[56] References Cited

U.S. PATENT DOCUMENTS

| | | | |
|---|---|---|---|
| 971,613 | 10/1910 | Hollister | 135/121 |
| 1,261,213 | 4/1918 | Clay . | |
| 1,839,673 | 1/1932 | Hartmann | 119/513 |
| 3,256,858 | 6/1966 | Pals | 119/512 |
| 3,724,424 | 4/1973 | Benjamin | 119/512 |
| 3,744,456 | 7/1973 | Wheeler et al. | 119/513 |
| 3,885,524 | 5/1975 | Gregory | 119/16 |
| 4,067,547 | 1/1978 | Peters | 256/23 |
| 4,176,621 | 12/1979 | Dill | 119/20 |
| 4,229,914 | 10/1980 | Lucas | 52/63 |
| 4,347,690 | 9/1982 | Wallace, Jr. | 52/93 |
| 4,683,901 | 8/1987 | Mitchell | 135/97 |
| 4,844,424 | 7/1989 | Knudslien | 256/26 |
| 5,117,853 | 6/1992 | Preusner | 135/121 |
| 5,167,246 | 12/1992 | Mortenson | 135/143 |
| 5,185,972 | 2/1993 | Markiewicz | 52/63 |
| 5,400,743 | 3/1995 | Buckley | 119/502 |
| 5,564,367 | 10/1996 | Boyanton | 119/474 |
| 5,626,098 | 5/1997 | Askins et al. | 119/474 |
| 5,813,160 | 9/1998 | Thoekle | 135/121 |

*Primary Examiner*—Peter M. Poon
*Assistant Examiner*—Elizabeth Shaw
*Attorney, Agent, or Firm*—Madson & Metcalf

[57] ABSTRACT

A modular animal shelter is conveniently relocatable, inexpensive to construct, and sufficiently durable to house large animals for extended periods of time. The modular animal shelter may be formed using a plurality of prefabricated, discrete, detachably interconnected side panels to define at least a partial enclosure. Each side panel may comprise a plurality of rails supported by a plurality of substantially vertical posts transverse to the rails. The side panels may be supported in a vertical disposition through the interconnecting of the side panels, such that the side panels are self-supporting without being anchored to the ground. A covering for the modular animal shelter may be formed substantially of a foldable material, and preferably extends over the enclosure to shelter the enclosure. The covering is preferably detachably connected to the side panels. A plurality of support members may be detachably connected to the tops of two of the opposing side panels to support the covering. Preferably, the support members are elongated and bowed and attach to the side panels with an insert fit. The side panels, covering, and support members are preferably modular and conveniently detachable from each other such that the animal shelter is adapted for convenient disassembly, transport, and subsequent reassembly.

19 Claims, 4 Drawing Sheets

MODULAR ANIMAL SHELTER

BACKGROUND OF THE INVENTION

1. The Field of the Invention

The present invention relates to buildings and structures for housing livestock and other large animals and for sheltering such animals from the elements. More specifically, the present invention relates to modular, reconfigurable, and relocatable buildings and structures for sheltering and housing livestock and other large animals.

2. The Relevant Technology

Animals, and particularly large animals and livestock, are typically more rugged and require less care than humans. Nevertheless, most animals do require some shelter from the elements in order to thrive. This is particularly so for livestock that are kept in extremely hot, rainy, or cold weather environments. Thus, it should be readily appreciated that providing proper shelter for livestock and other animals is of high concern to owners of these animals. The problem is most acute for animals that are too large to be sheltered within the owner's house or garage when the weather is inclement, and which are typically confined within pastures or corrals without natural shelter such as trees and the like.

In answer to the need to provide shelter for their animals, animal owners often house their animals, and particularly livestock, within barns, stables, sheds, or other permanent structures. These structures are generally adequate to provide shelter from sun, rain, snow, and extreme cold and damp. Additionally, such permanent structures are generally sturdy and durable and designed to withstand the animals pushing on, rubbing against, and even chewing on the walls thereof.

Such barns, sheds, and stables may be fully enclosed, but are often provided with openings that permit access to larger enclosures. The larger enclosures typically comprise open areas, such as corrals and pastures, in which the animals may gain exposure to sun and open air and which provide space for the animals to graze and move about.

One additional use for such structures is to house female animals during the birthing process. The privacy afforded by the shelter is advantageous during the birthing process, and the shelter also gives the newly birthed animal a greater chance of initial survival.

Also, conventional shelters are often provided with areas which are blocked off in such a way as to allow smaller animals to enter, but to prevent the entrance of larger animals. Such a use is often made in colder weather environments where foals, calves, and other young animals are born during the harshness of winter. Providing a warm dry place for the young animals to take shelter and sleep without the environment being soiled and dampened by larger animals is highly beneficial.

Conventional animal shelters, on the other hand, also exhibit certain shortcomings. For instance, conventional animal shelters are typically constructed from cinder block, concrete, tin, and/or wood. The construction thereof is, accordingly, a somewhat time consuming and expensive process. The high degree of time and expense involved in the construction of such permanent structures can be prohibitive to many animal owners in providing adequate shelters for their animals.

Additionally, conventional animal shelters are typically fixed in place and permanently anchored in the ground with concrete and the like. Such structures are not highly efficient in situations where the livestock need to be regularly relocated to new pastures or other locations. For instance, when livestock consumes the forage in a single corral, pasture, or range it is usually required that the livestock be relocated. In fact, livestock are often rotated among a number of corrals, pastures, or ranges. In such situations, a single, permanently fixed shelter as provided by the prior art is inadequate. Additionally, due to the cost of conventional shelters, it is impractical to build a shelter in each enclosure the animals are to be relocated to. Consequently, in many cases, either no shelter is provided, or only a single shelter, confined to a single location, is provided. Other pastures, corrals, and/or ranges are left without shelters.

The fixed, non-relocatable nature of conventional shelters presents further shortcomings, in that many animal owners frequently relocate or move about with their animals. Consider sheep herders, rodeo participants, and horse owners with relatively transient lifestyles or no suitable permanent location for building stables. Permanent structures are prohibitively expensive and/or impractical for many such people.

As a further consideration, conventional, permanently fixed shelters need to be frequently cleaned, a distasteful and time-consuming task, and one for which most animal owners would agree that it would be beneficial to be able to avoid. An inexpensive and easily relocatable animal shelter would eliminate this need.

Accordingly, a need exists for a relatively inexpensive, relocatable animal shelter that remedies many or all of the above-discussed short-comings of conventional animal shelters. Particularly, a relocatable animal shelter which could be inexpensively constructed and conveniently deconstructed, transported, and reconstructed would be an advantageous addition to the art. Such a relocatable animal shelter would be further beneficial if it were sufficiently strong and durable to house large animals such as cattle and horses securely for long periods of time.

OBJECTS AND BRIEF SUMMARY OF THE INVENTION

The apparatus of the present invention has been developed in response to the present state of the art, and in particular, in response to the problems and needs in the art that have not yet been fully solved by currently available animal shelters. Thus, it is an overall objective of the present invention to provide an animal shelter that overcomes many or all of the problems discussed above as existing in the prior art.

To achieve the foregoing object, and in accordance with the invention as embodied and broadly described herein in the preferred embodiments, a modular animal shelter is provided. The modular animal shelter is preferably conveniently relocatable, and is preferably formed from a plurality of discrete, prefabricated side panels. The side panels are preferably adapted to detachably interconnect with each other to form at least a partial enclosure.

Each side panel may be formed from a plurality of elongated rails supported by a number of substantially vertical posts disposed substantially transverse to the rails. The side panels are preferably supported in a vertical disposition through the interconnecting of the side panels, such that the side panels are self-supporting without being anchored to the ground.

A covering is also provided, and is preferably formed of a single, unitary member or piece of material. More preferably, the covering is formed from a foldable material such as a canvas or thermoplastic tarp. The covering extends over the enclosure to provide shelter thereto, and is preferably detachably connected to the side panels.

A plurality of support members are also provided under the present invention. Preferably, the support members are detachably connectable to the side panels and provide support to the covering.

In one embodiment, the support members comprise elongated bows. The bows extend above and between opposing side panels. One end of each of the elongated bows is preferably detachably connected with an insert fit to one of the opposing side panels to support the covering over the enclosure between the opposing side panels.

It is also preferred under the present invention that the side panels, covering, and support members are modular and conveniently detachable from each other such that the animal shelter is adapted for convenient disassembly, transport, and subsequent reassembly.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 also includes details 1A, 1B, 1C, and 1D showing specific embodiments of fasteners used in the present invention.

FIG. 2 also includes details 2A and 2B showing specific embodiments of additional fasteners used in the present invention.

DETAILED DESCRIPTION OF THE PREFERRED EMBODIMENTS

Figure 1:
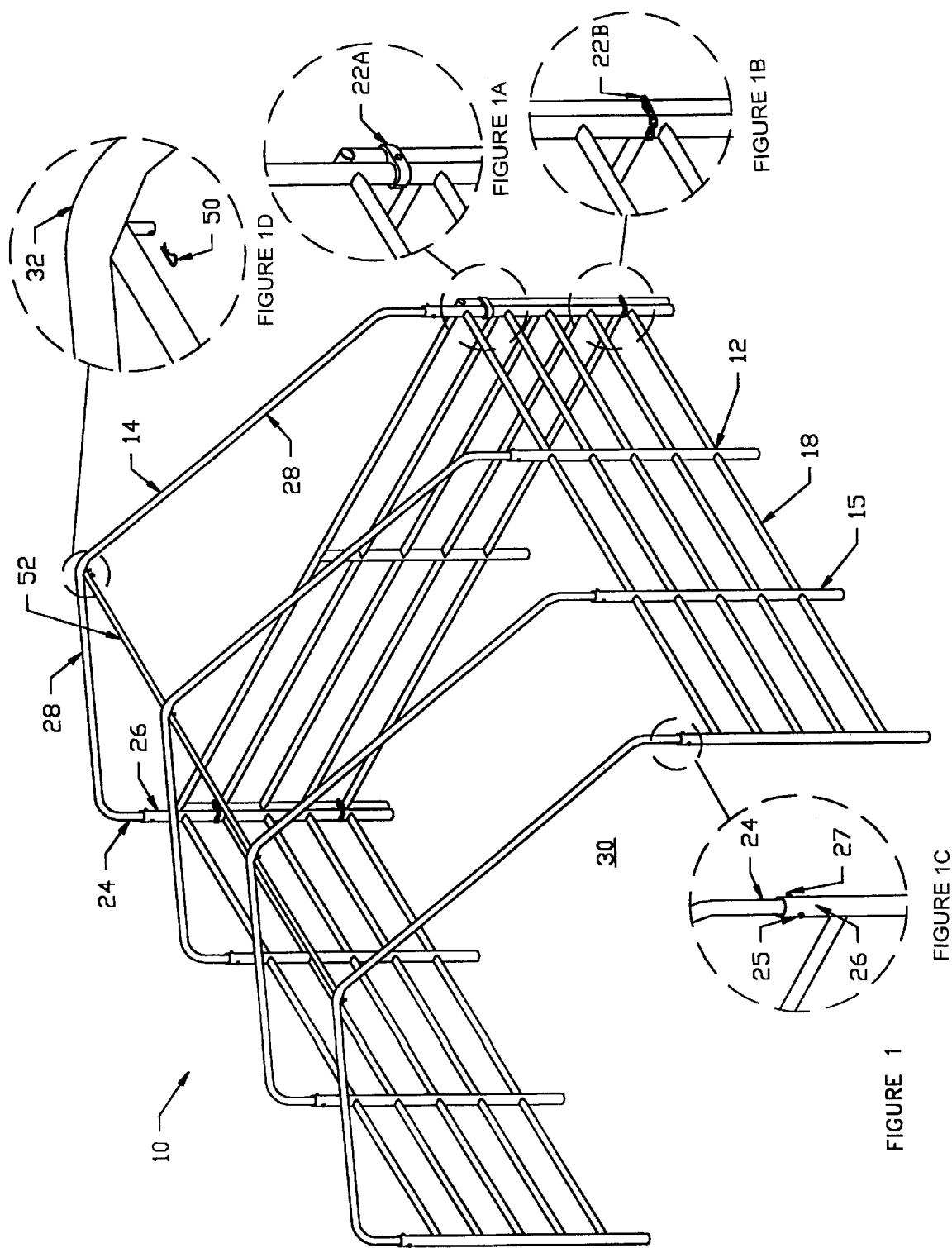
FIG. 1 is a perspective view illustrating one embodiment of a modular animal shelter of the present invention utilizing the modular panels and bowed support members of the present invention.

Reference is now made to the figures, wherein like parts are referred to by like numerals throughout. With reference to FIG. 1, a modular animal shelter is generally designated at 10. In the depicted embodiment, the modular animal shelter 10 includes the basic components of a plurality of side panels 12, a plurality of support members 14, and a covering 16 (shown in FIG. 2).

The side panels 12 are preferably modular and prefabricated. As used herein, the term modular is intended to mean that standard components such as the side panels 12 or the support members 14 connect to each other or to other standard components, substantially interchangeably. As such, it is helpful if the interchangeable components are similarly or identically configured, but it is not necessary, so long as the components are adapted to connect to each other using a common mechanism, method, or device.

Additionally, it is preferred that the side panels 12 are sufficiently sturdy to withstand the rubbing, chewing, and exertion of great amounts of force that are experienced when dealing with larger animals. Accordingly, in the depicted embodiment, the side panels 12 are formed from a series of elongated, horizontally extending rails 18. Supporting the rails 18 are a plurality of elongated, vertically extending posts 20. The posts 20 are disposed transverse to the rails 18 and are fastened to the rails 18 by welding, bolts, or other suitable means. The rails 18 of each side panel 12 are, in the depicted embodiment, a single unit, extending the length of the side panel 12 and passing through openings in the posts 20. In the depicted embodiment, both the rails 18 and the posts 20 are formed from elongated, hollow steel cylinders.

In a further, specifically contemplated embodiment, the side panels 12 may comprise or contain sheets of material, such as thin plate steel. Additionally, it is contemplated that, the side panels 12 could be formed partially or totally from wood, aluminum, fiberglass, or any other suitable material. Of course, the side panels 12 could also be formed from other materials and with other shapes and configurations, but it is preferred that the side panels 12 are formed in such a manner as to be sturdy and conveniently disassembled, transported, and subsequently reassembled.

The side panels 12 are preferably adapted to be detachably interconnected in a convenient manner to form an enclosure 30. In the depicted embodiment, fasteners 22 are used to join adjoining ends of the side panels 12. The fasteners 22 may comprise clamps (22A in Detail 1A), chains (22B in Detail 1B), pins, bands, rope, straps, or any other convenient fastening device. The side panels 12 may also be connected in other manners commonly known in the art. One such connection, for example, comprises one or more metal loops on each of the adjoining panels and a pin that drops through the collective metal loops.

A further advantageous feature of the present invention, as seen in FIG. 1, is that the side panels 12 may be supported in an upright position through the interconnection of the side panels 12. In FIG. 1, three side panels 12 are configured in a "U" shape, with a central side panel on one end and two other side panels extending in a orthogonal direction from the end panel and perpendicular to each other. Accordingly, because the side panels 12 are connected to each other and lend support to each other, the need for anchoring the animal shelter 10 to the ground is eliminated. This feature, in part, allows the modular animal shelter 10 to be portable. Of course, if a higher degree of support is desired, the side panels 12 could still be anchored to the ground.

Figure 2:
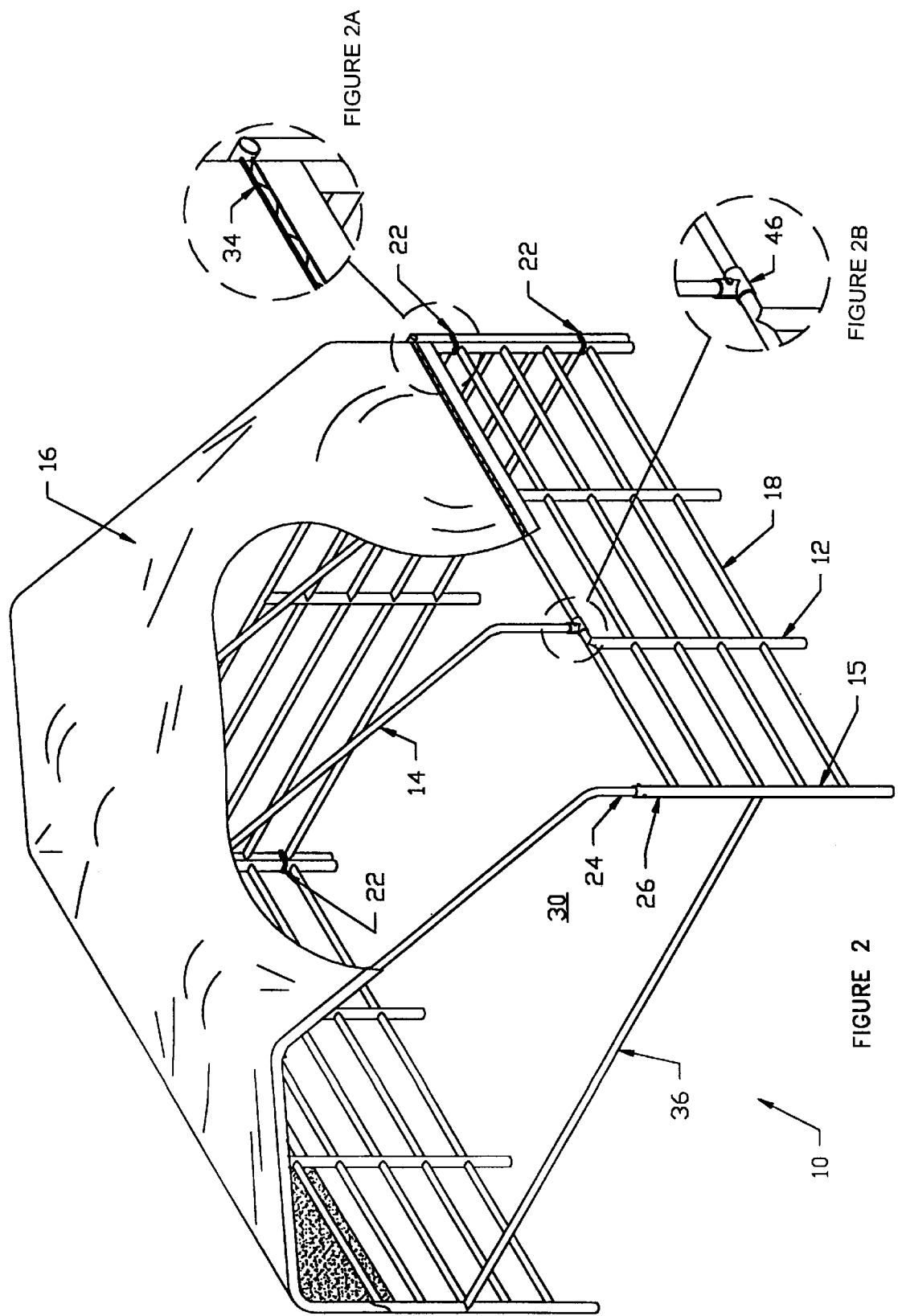
FIG. 2 is a perspective view illustrating a one embodiment of the modular animal shelter of FIG. 1 and also including a foldable covering and a large animal barrier.
Figure 3:
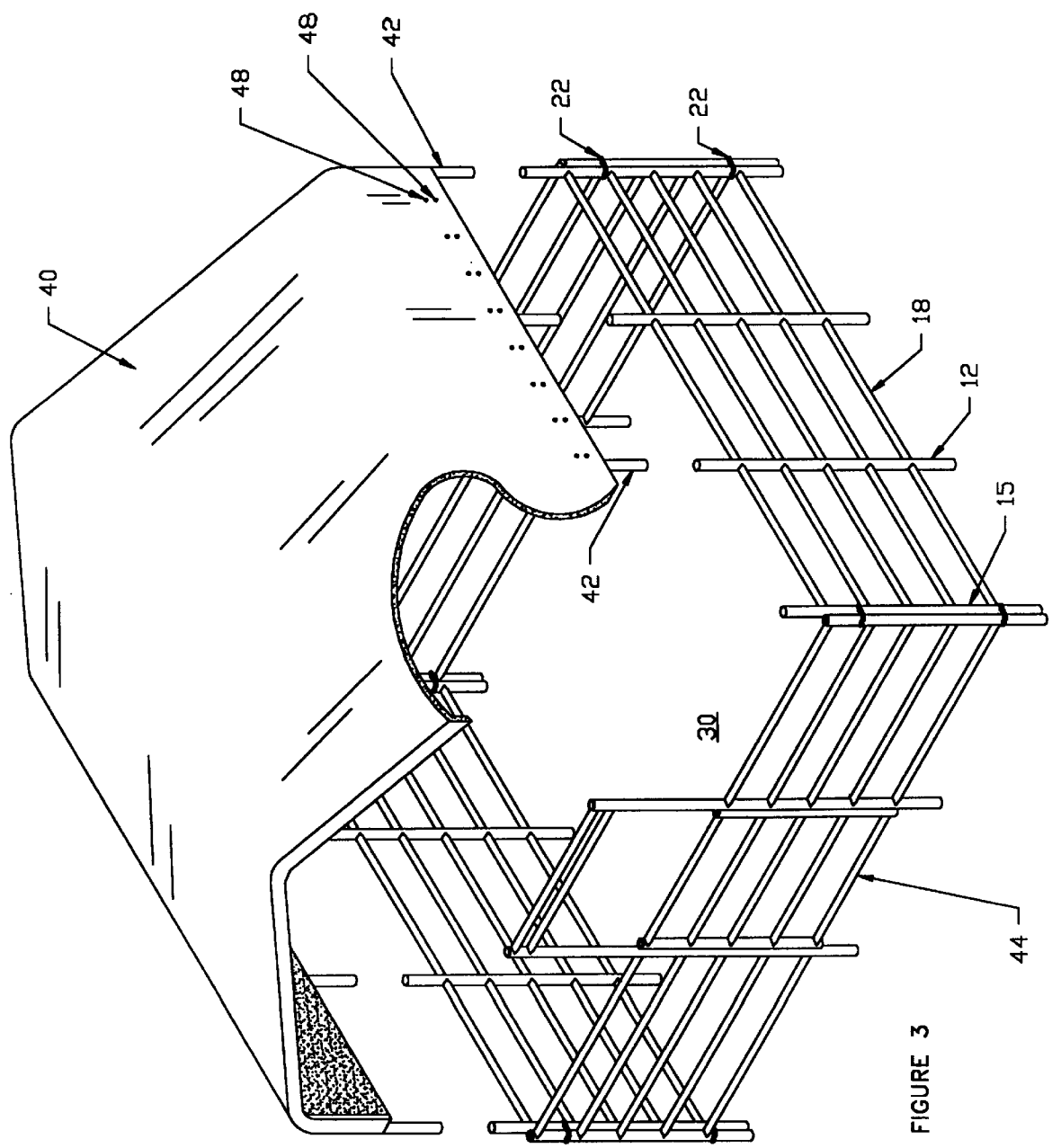
FIG. 3 is a perspective view illustrating one embodiment of a modular animal shelter of the present invention including a self-supporting covering and a gate.
Figure 4:
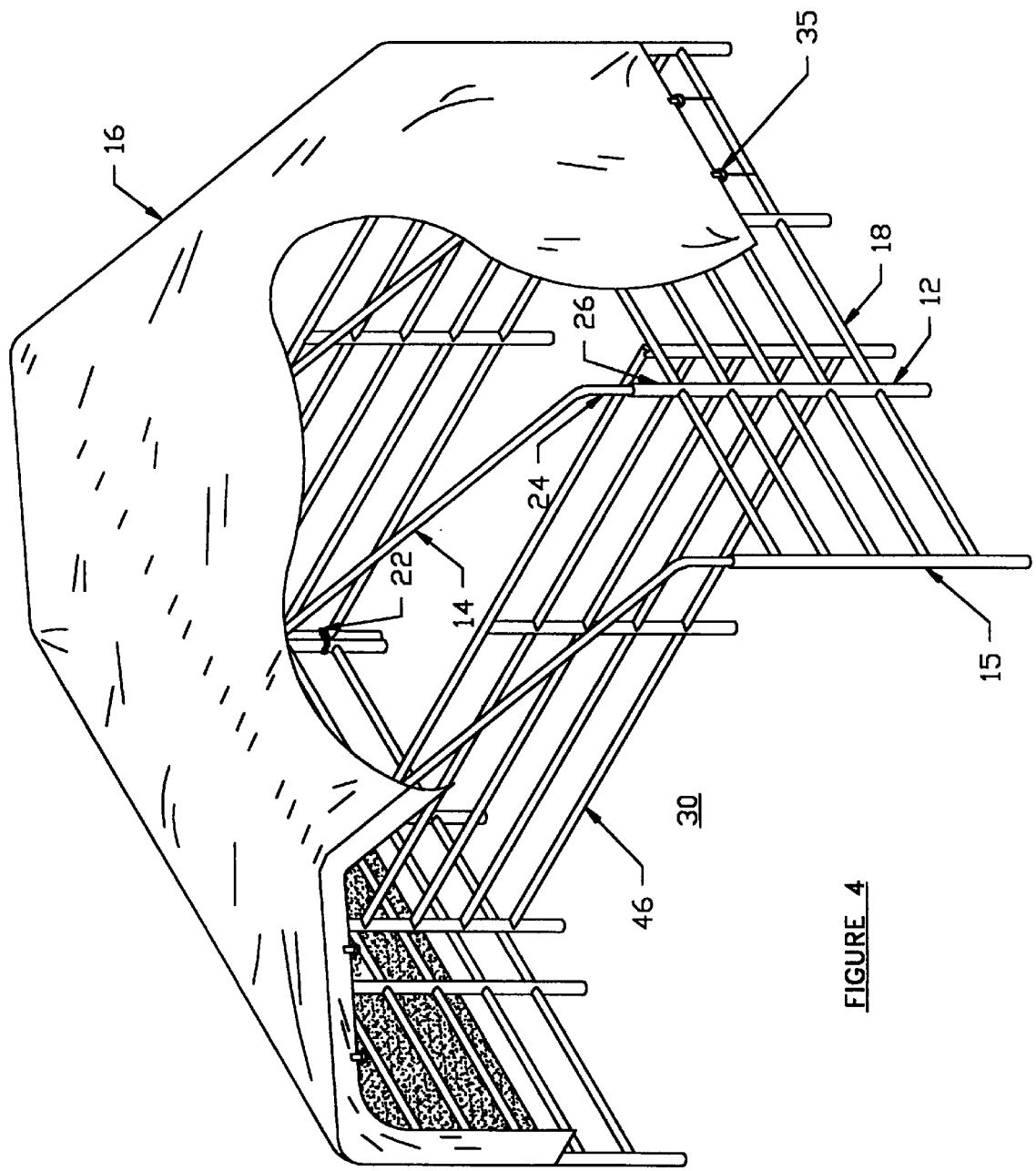
FIG. 4 is a perspective view illustrating a further embodiment of a modular animal shelter of the present invention including a center partition and a covering partially covering the side panels.

FIGS. 1 and 2 depict only a very basic configuration of a modular animal shelter 10 of the present invention. Only three side panels 12 are shown. One skilled in the art will readily appreciate that the animal shelter 10 could comprise any number of side panels 12, and that the side panels 12 could be arranged in any suitable shape. For example, the sides or end of the modular animal shelter 10 could be longer, the open side could be closed off or provided with a gate, as seen in FIG. 3, and the side panels 12 could also be arranged into a triangle, pentagon, hexagon, or the like, such that the enclosure 30 is of a corresponding shape. Partitions, as seen in FIG. 4, can also be employed. Taken to the extreme, if sufficient side panels 12 are used, the enclosure 30 could be substantially circular, for use in creating portable arenas, or the like.

A further advantage of the present invention, due to the modularity of the side panels 12, is that the modular animal shelter 10, once formed, may be subsequently reconfigured in a variety of different manners. Thus, if a gate 44 (of FIG. 3) is desired, the gate 44 can be added or removed at any time. If one or more partitions 46 (shown in FIG. 4) are desired, the partitions 46 can be added or removed at any time. With the use of multiple coverings, or even a modular covering with pieces that zip or otherwise fasten together, even the overall shape of the modular animal shelter 10 can be reconfigured.

Individual stalls can be added and configured, as can gates, tack rooms, feed storage rooms, alley ways, and other individual partitions. Due to the modularity of the animal shelter 10 of the present invention, these features can be added or removed at any time, providing the flexibility of having many different animal shelters within a single, inexpensive unit.

It is preferred that the support members 14 are adapted to detachably connect to the side panels 12. In the context of the present invention, this means that the support members 14 are not permanently connected to side panels 12, and that the support members 14 can be disconnected from the side panels 12 within a relatively short period of time when it is desired to relocate the modular animal shelter 10.

In the depicted embodiment of FIG. 1, the support members 14 are single, unitary members that are bowed into a substantially gabled shape. The support members 14 as depicted, comprise male end portions 24, intermediate portions 28, and a centralized apex 32. The male end portions 24 connect with female receiving portions 26 of the side panels 12 with an insert fit as shown in Detail 1C.

As used herein, the term "insert fit" is intended to mean a manner of connecting two members in a male/female relationship wherein an end of one of the two members is received within an end of the other of the two members. Of course, the arrangement of FIGS. 1 and 2 could be reversed, with the side panels 12 comprising the male members, and the support members 14 comprising therein the female members. The insert fit may also be secured by passing a bolt 25, through the combined male and female portions 24, 26, and fastening it with a locking nut 27. Additionally, the insert fit could be secured with other types of fasteners, such as a pin or a threaded locking ring connected to one of the male and female portions 24, 26 and threading to threads of the other.

A further embodiment for connecting the support members 14 to the side panels 12 comprises two clamp halves (not depicted) that are held together with a bolt which passes through the two clamp halves and through the end of the support member 12. When the bolt is tightened, curved jaws of the clamp halves tighten around and grip a rail 18 of the side panel 12, thereby fastening the support member 14 to the side panel 12.

Of course, the support members 14 need not be gable-shaped, or even bowed, but it is preferred that the support members 14 be adapted to support the covering 16. It is also preferred that the support members 14 be detachably connectable to the side panels 12, and that the connection be conveniently detachable. As used herein, the term "conveniently detachable" is intended to mean that the particular components referred to can be separated within a relatively short period of time and without destroying the components. Examples include the insert fit discussed, or attachment with the use of fasteners such as pins, bolts, and the like. A conventional roof that is nailed or stapled in place would not be considered to be conveniently detachable.

Also shown in FIG. 1 is an optional cross beam 52 which may be used to strengthen and maintain the spacing between the support members 14. In the depicted embodiment, the cross beam 52 is fastened at the apexes 32 of the support members 14. The cross beam 52 extends substantially transverse to, and is fastened with locking pins (not shown) to the support members 14.

FIG. 2 shows the covering 16 and one manner of attaching the covering 16 to the side panels 12. As seen in Detail 2A, the covering 16 may be attached to the side panels 12 with a fastener 34. In the depicted embodiment, the fastener 34 comprises a spring clamp. The spring clamp comprises a channeled member located the interior side of the covering 16 and fastened to the side panels 18. A Z-shaped spring member on the exterior side of the covering 16 holds the covering 16 within the channeled member.

In further specifically contemplated embodiments, the fastener 34 may comprise straps provided with buckles or velcro, chains, hooks, and the like. In the embodiment of FIG. 4, a fastener 35 comprising a D-ring is employed.

Shown in FIG. 3 is an embodiment in which the covering is a unitary, self-supporting single-piece covering 40, and the support members comprise posts 42 attached to the covering 40, with bolts 48. The covering 40 is in the embodiment of FIG. 3, formed of a substantially hardened material such as fiberglass, plastic, or metal. The covering 40 could be formed from metal storage tanks and the like by cutting the metal storage tanks in half and fastening the posts 42 thereto.

The posts 42 are shown bolted to the covering 40 in FIG. 3, but could also be integral to or otherwise attached to the covering 40 to support the covering 40 above the side panels 12 and over the enclosure 30. The posts 42 are preferably detachably connectable to the side panels 12. In the depicted embodiment, the posts 42 attach to the side panels 12 with an insert fit, as has been described above.

Of course, the support members could be permanently attached to the side panels 12 and be detachably connected to the covering 42. Thus, for instance, the covering 40 could be provided with a plurality of female members for attaching with an insert fit, to a plurality of male support members fixed to the side panels 12.

In FIG. 4, an embodiment is shown with a covering 16 which is again foldable, but which substantially covers the side panels 12. The covering 16 is attached to the side panels 12 with D-ring connectors 35 and straps. The covering 16 is also attached to the support members 14 with the D-ring connectors 35 and straps.

It should be readily apparent that the covering 16 could be of many different shapes, sizes, and configurations to accommodate the flexibility accorded by the modularity of the animal shelter 10. Thus, for instance, during the summer, when it is desired that wind be allowed to cool the interior of the modular animal shelter 10, a covering 16 such as that of FIG. 1 can be used, and when the weather turns cold, the covering 16 of FIG. 4 can be used to better provide greater shelter from the wind and elements.

The present invention can be conveniently assembled, disassembled, and relocated, such that the modular animal shelter can be conveniently moved about and relocated when the animals it shelters are moved about. This eliminates the need to construct a separate animal shelter for each enclosure or area in which the animals may be desired to be located.

The need for cleaning the modular animal shelter can be avoided by merely moving the animal shelter periodically. The animal shelter can be easily enlarged or reconfigured depending upon the changing needs of the animal owner. Furthermore, the animal shelter is sufficiently sturdy and durable to withstand the rigors associated with confining large animals.

From the above discussion, it should be readily apparent that the many novel features and aspects of the modular animal shelter of the present invention provide numerous advantages over the prior art. Specifically, embodiments of the modular animal shelter are inexpensive, modular, and relocatable. Accordingly, the need in the prior art for such an animal shelter which overcomes the drawbacks exhibited by expensive, permanently fixed animal shelters has been met by the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An animal shelter, comprising:
    a plurality of discrete, detachably interconnecting side panels adapted to form at least a partial enclosure;
    a covering for sheltering the enclosure; and
    a plurality of support members adapted to detachably connect to the side panels to support the covering and maintain the covering in a selected position over the enclosure,
   wherein the support members comprise bows adapted at either end to connect to and extend upward from a side panel in order to support the covering over the enclosure.

2. An animal shelter as recited in claim 1, wherein the side panels, covering, and support members are each modular and detachable from each other for disassembly, transport, and subsequent reassembly of the animal shelter.

3. An animal shelter as recited in claim 1, wherein the support members are adapted to detachably connect to the side panels with an insert fit.

4. An animal shelter as recited in claim 1, wherein the side panels are prefabricated.

5. An animal shelter as recited in claim 4, wherein the covering and the support members are prefabricated.

6. An animal shelter as recited in claim 1, wherein the side panels are adapted to be supported in a vertical disposition through the interconnecting of the side panels and without the need for being anchored to the ground.

7. An animal shelter as recited in claim 1, wherein the covering is a single, unitary object.

8. An animal shelter as recited in claim 7, wherein the covering is formed substantially from a foldable material.

9. An animal shelter as recited in claim 7, wherein the covering is formed substantially from a rigid, self-supporting material.

10. An animal shelter as recited in claim 1, wherein a plurality of the side panels are arranged opposing others of the plurality of the side panels to form the enclosure, and wherein the support members comprise elongated bows spanning the enclosure, an end of each of the bows being detachably connected with an insert fit to a separate one of the opposing side panels, and the covering being fastened to the side panels and extending over the bows.

11. An animal shelter as recited in claim 1, wherein the covering is formed from a substantially rigid, self-supporting material, and wherein the support members comprise vertical posts extending upward from the side panels to the covering and fastened to the covering.

12. A modular animal shelter as recited in claim 1, wherein the side panels comprise a plurality of substantially vertical posts, the posts supporting a plurality of rails that are disposed substantially transverse to the posts.

13. An animal shelter, comprising:
    a plurality of discrete, detachably interconnecting side panels adapted to form at least a partial enclosure;
    a covering for sheltering the enclosure; and
    a plurality of bowed support members adapted at either end to detachably connect to and extend upward from the side panels to support the covering and maintain the covering in a selected position over the enclosure, the side panels, covering, and support members being modular and conveniently detachable from each other for convenient disassembly, transport, and subsequent reassembly of the animal shelter.

14. An animal shelter as recited in claim 13, wherein the support members detachably connect to the side panels with an insert fit.

15. An animal shelter as recited in claim 14, wherein the side panels are prefabricated.

16. An animal shelter as recited in claim 15, wherein the covering and support members are prefabricated.

17. An animal shelter as recited in claim 16, wherein the side panels are adapted to be supported in a vertical disposition through the interconnecting of the side panels and without the need for being anchored to the ground.

18. An animal shelter as recited in claim 17, wherein the covering is formed substantially from a foldable material.

19. An animal shelter, comprising:
    a plurality of prefabricated, discrete, detachably interconnected side panels forming at least a partial enclosure, each side panel comprising a plurality of substantially vertical posts supporting a plurality of rails disposed substantially transverse to the posts, the side panels being supported in a vertical disposition through the interconnecting of the side panels, such that the side panels are self-supporting without being anchored to the ground;
    a covering formed substantially of a foldable material, the covering extending over the enclosure and being detachably connected to the side panels for sheltering the enclosure; and
    a plurality of elongated, bowed support members spanning the enclosure and supporting the covering, either end of each of the bowed support members being detachably connected with an insert fit to a separate one of the opposing side panels in order to support the covering over the enclosure, and wherein the side panels, covering, and support members are modular and conveniently detachable from each other such that the animal shelter is adapted for convenient disassembly, transport, and subsequent reassembly.

* * * * *